US012098024B2

(12) United States Patent
Sedory et al.

(10) Patent No.: US 12,098,024 B2
(45) Date of Patent: Sep. 24, 2024

(54) REFUSE CONTAINER HAVING MODULAR SIDE WALLS

(71) Applicant: Wastequip, LLC, Charlotte, NC (US)

(72) Inventors: Samuel Sedory, Charlotte, NC (US); Nicholas Franiak, Waxhaw, NC (US); Joshua Stidham, Mooresville, NC (US); Matthew Del Valle, Charlotte, NC (US)

(73) Assignee: Wastequip, LLC, Charlotte, NC (US)

( * ) Notice: Subject to any disclaimer, the term of this patent is extended or adjusted under 35 U.S.C. 154(b) by 70 days.

(21) Appl. No.: 17/844,688

(22) Filed: Jun. 20, 2022

(65) Prior Publication Data

US 2023/0406615 A1 Dec. 21, 2023

(51) Int. Cl.
*B65D 90/02* (2019.01)
*B65D 90/18* (2006.01)
*B65F 1/02* (2006.01)

(52) U.S. Cl.
CPC .............. *B65F 1/02* (2013.01); *B65D 90/023* (2013.01); *B65D 90/18* (2013.01); *B65F 2220/101* (2013.01)

(58) Field of Classification Search
CPC .... B65D 90/023; B65D 90/08; B65D 88/005; B65D 88/123; E04C 2/08; E04C 2/384
USPC ......... 52/588.1, 79.5, 79.9; 296/186, 1, 205; 220/4.28, 4.33
See application file for complete search history.

(56) References Cited

U.S. PATENT DOCUMENTS 2,019,707 A * 11/1935 Jenkins .................. E04C 2/324 52/630
3,631,647 A 1/1972 Merkin
3,692,349 A * 9/1972 Ehrlich .................. B62D 33/04 296/186.1
3,803,738 A 4/1974 Weiss
3,817,569 A * 6/1974 Ehrlich .................... B60J 5/108 296/186.1
4,810,027 A * 3/1989 Ehrlich .................. B62D 33/04 52/461
4,840,127 A * 6/1989 Tomaka ................. B61D 17/08 105/396
4,904,017 A * 2/1990 Ehrlich .................. B62D 33/04 296/29
4,913,301 A 4/1990 Pickler
(Continued)

OTHER PUBLICATIONS

Non-Final Office Action dated Apr. 11, 2024 in U.S. Appl. No. 18/210,373.

*Primary Examiner* — Mollie Impink
(74) *Attorney, Agent, or Firm* — Nelson Mullins Riley & Scarborough LLP

(57) ABSTRACT

In one aspect, a container includes first, second, and third side walls, and an open end. The container also includes a bottom wall coupled with the first, second, and third side walls. Additionally, the container includes a door pivotably coupled to the container and movable between a first position at which the door is spaced apart from the at least one open end and a second position at which the door closes the at least one open end. The container defines an interior volume of at least ten (10) cubic yards. At least one of the first, second, and third side walls includes a plurality of vertically-extending side panels releasably fastened together. Each of the plurality of side panels defines a planar body portion and at least one projection from the planar body portion.

11 Claims, 16 Drawing Sheets

(56) References Cited

U.S. PATENT DOCUMENTS

| | | | | | |
|---|---|---|---|---|---|
| 4,940,279 | A | | 7/1990 | Abott et al. | |
| 5,088,875 | A | | 2/1992 | Galbreath et al. | |
| 5,154,302 | A | | 10/1992 | Alcorn | |
| 5,531,559 | A | | 7/1996 | Kruzick | |
| 5,542,807 | A | | 8/1996 | Kruzick | |
| 5,584,527 | A | * | 12/1996 | Sitter | B62D 33/046 296/191 |
| 5,619,837 | A | | 4/1997 | DiSanto | |
| 5,876,089 | A | * | 3/1999 | Ehrlich | B62D 33/046 296/186.1 |
| 5,884,794 | A | | 3/1999 | Calhoun et al. | |
| 5,938,274 | A | * | 8/1999 | Ehrlich | B62D 29/045 296/181.3 |
| 5,992,117 | A | * | 11/1999 | Schmidt | B62D 33/046 52/584.1 |
| 5,997,076 | A | * | 12/1999 | Ehrlich | B62D 33/046 296/186.1 |
| 6,199,939 | B1 | * | 3/2001 | Ehrlich | B65D 90/08 52/582.1 |
| 6,527,335 | B1 | | 3/2003 | Yurgevich | |
| 6,652,018 | B2 | * | 11/2003 | Buchholz | B62D 33/046 52/800.11 |
| 7,198,166 | B2 | | 4/2007 | Sholinder | |
| 7,789,256 | B2 | | 9/2010 | Petzitillo, Jr. et al. | |
| 9,067,729 | B2 | * | 6/2015 | Fenton | B65D 88/12 |
| 9,446,656 | B2 | | 9/2016 | Alder | |
| 9,738,050 | B2 | * | 8/2017 | Lee | B32B 3/06 |
| 9,863,146 | B2 | * | 1/2018 | Bogh | E04D 3/30 |
| 9,896,013 | B2 | | 2/2018 | Franiak et al. | |
| 10,144,583 | B2 | | 12/2018 | Monaco et al. | |
| 10,730,568 | B2 | * | 8/2020 | Ehrlich | B62D 65/024 |
| 11,370,603 | B2 | | 6/2022 | Chojecki et al. | |
| 2010/0162929 | A1 | * | 7/2010 | Smit | E04H 9/10 109/79 |
| 2015/0034637 | A1 | * | 2/2015 | Durand | B65D 11/22 29/700 |

* cited by examiner

REFUSE CONTAINER HAVING MODULAR SIDE WALLS

TECHNICAL FIELD

Embodiments of the present invention generally relate to the field of material-hauling containers. More particularly, certain embodiments of the present invention relate to improved refuse containers, including but not limited to roll-off dumpsters, having non-welded side wall assemblies. Among other things, various embodiments provide roll-off containers having a side walls comprising a plurality of panels that are releasably fastened together.

BACKGROUND

In the waste and materials hauling industry, a variety of containers are used to collect, transport, and/or dump waste, bulk, and liquid materials, among others. Such containers typically are carried on vehicles, such as trucks, or on trailers. The vehicle or trailer is provided with a hoist apparatus to load a container onto and unload the container from the vehicle or trailer, transport the container, and empty the container. Examples of hoist apparatuses include hook hoists, cable hoists, winches, forklifts, and container handlers. The containers loaded and carried by hoist apparatuses may be very heavy, especially when filled. Accordingly, and for example, hoist apparatuses may be rated for a container capacity of 20,000 or 30,000 lbs. Heavier duty hoist apparatuses can be rated for more than 30,000 lbs., in some cases up to 75,000 lbs. or greater.

One type of refuse container is known as a "roll-off container." Roll-off containers can be used in a variety of demanding waste applications, including scrap collection, construction and remodeling, demolition, and industrial clean-up, among others. Roll-off containers are usually designated by the volume of material they can contain, such as 10, 20, 30, or 40 cubic yards. Roll-off containers are currently available from a number of companies, such as Wastequip, LLC of Charlotte, North Carolina.

Two common types of roll-off containers are rectangular, open top roll-offs and "tub-style" roll offs. The latter style of roll-off container has smooth sides and may be stackable for transporting and storage. FIGS. 1-2 are perspective views of the former style of roll-off container, a rectangular, open top roll-off container 10. Container 10 includes a body 12 including walls 14 and a door 16 provided on hinges at one end thereof to facilitate access to the interior volume of container 10. Container 10 is made out of a suitable metal material, such as steel. Walls 14 can be fabricated from steel, and a floor plate of container 10 (not shown) can be made from 7 gauge steel, for example. Also, walls 14 are reinforced by a plurality of vertical supports 18 which extend between a top rail 20 and a bottom sill 22 of container 10. Also, container 10 typically includes at least one set of wheels 24 to allow container 10 to be rolled in place and onto and off of a truck frame via a hoist apparatus. In FIGS. 1-2, two sets of wheels 24 are provided. Container 10 also may include a pair of main rails 26 used to provide support for heavy refuse and to facilitate placement of container 10 on the truck frame.

As shown in FIG. 3, a vehicle 30 equipped with a cable hoist has a cab 32 and is configured to support a roll-off container 34 on a sub-frame 36 of the cable hoist pivotably connected with vehicle frame. A covering apparatus 38 is provided to extend and retract a cover over the top of container 34, as is well understood. Vehicle 30 is used for loading, unloading, transporting, and dumping container 34. For example, the sub-frame 36 of the cable hoist can be elevated and lowered relative to the vehicle frame using hydraulic cylinders, as is also well known. When the sub-frame 36 is elevated to an inclined position, it may serve as a ramp upon which container 34 may be pulled or slid onto and off of the hoist apparatus, for instance using a cable winch system to draw container 34 upward. Container 34 may also be dumped when the sub-frame 36 is in the inclined position. When container 34 is suitably secured on the sub-frame 36, the sub-frame 36 may be lowered into the position shown in FIG. 3 for transport. Those of skill in the art will appreciate that other types of hoist apparatuses may be used to load, unload, transport, and dump roll-off container 34, such as a vehicle equipped with a hook hoist. Additional background regarding vehicle mounted hook hoists is provided in U.S. Pat. Nos. 5,542,807; 5,531,559; and 5,088,875, the entire disclosures of which are incorporated herein by reference for all purposes.

The foregoing discussion is intended only to illustrate various aspects of the related art in the field of the invention at the time, and should not be taken as a disavowal of claim scope.

SUMMARY

Some example embodiments comprise apparatus and methods for providing a refuse container with non-welded side walls. In various embodiments, the refuse container may comprise a roll-off container, intermodal container, or any suitable dump body, among others. In various embodiments, a refuse container side wall may comprise a plurality of formed sheets overlapped with one another and releasably fastened together (e.g., by bolts). Thus, example embodiments may improve manufacturing efficiency and speed and reduce cost by eliminating many or all welds on side wall assemblies, such as with regard to cross-members, top channels, and bottom channels. Various embodiments also provide the ability to manufacture virtually any size (e.g., cubic yardage) of refuse container with standard, and minimal, components. Additionally, various embodiments allow for "spot-fixes" of refuse container side walls "in the field," rather than a full wall or container replacement that would otherwise be required. A damaged wall segment can simply be swapped for a new segment and bolted into place. Embodiments of the invention also provide a roll-off container side wall having comparable and/or improved properties (in terms of form and function) relative to existing welded side walls.

According to one embodiment, the present invention provides a container comprising a first side wall, a second side wall opposite the first side wall, a front wall coupled with the first and second side walls, a rear wall opposite the front wall and coupled with at least one of the first and second side walls, and a bottom wall coupled with at least the first and second side walls and the front wall. The first side wall, second side wall, front wall, rear wall, and bottom wall together define an interior volume of at least ten (10) cubic yards. At least one of the first side wall, second side wall, front wall, and rear wall comprise a top rail, a bottom rail, a first side panel releasably fastened with the top rail and the bottom rail, and a second side panel releasably fastened with the top rail, the bottom rail, and the first side panel. The first side panel comprises a first body portion and a first projection having a first flange. The first flange is spaced apart from the first body portion. The second side panel comprises a second body portion and a second projection having a second flange. The second flange spaced apart from the second body portion.

In another embodiment, the present invention provides a container comprising first, second, and third side walls and an open end. The container also comprises a bottom wall coupled with the first, second, and third side walls. Additionally, the container comprises a door pivotably coupled to the container and movable between a first position at which the door is spaced apart from the at least one open end and a second position at which the door closes the at least one open end. The container defines an interior volume of at least ten (10) cubic yards. At least one of the first, second, and third side walls comprises a plurality of vertically-extending side panels releasably fastened together. Each of the plurality of side panels defines a planar body portion and at least one projection from the planar body portion.

According to yet another embodiment, the present invention provides a container comprising vertical side walls and a horizontal bottom wall coupled with the vertical side walls. The vertical side walls and bottom wall together define an interior volume of at least ten (10) cubic yards. At least one vertical side wall comprises a plurality of side panels releasably fastened together. Each of the plurality of side panels defines an inner wall portion and an outer wall portion spaced apart from the inner wall portion. The at least one vertical side wall also comprises a top rail releasably fastened with the inner wall portion of each of the plurality of side panels and a bottom rail releasably fastened with the inner wall portion of each of the plurality of side panels. The outer wall portions of the plurality of side panels extend vertically from the top rail to the bottom rail.

BRIEF DESCRIPTION OF THE DRAWINGS

Figure 1:
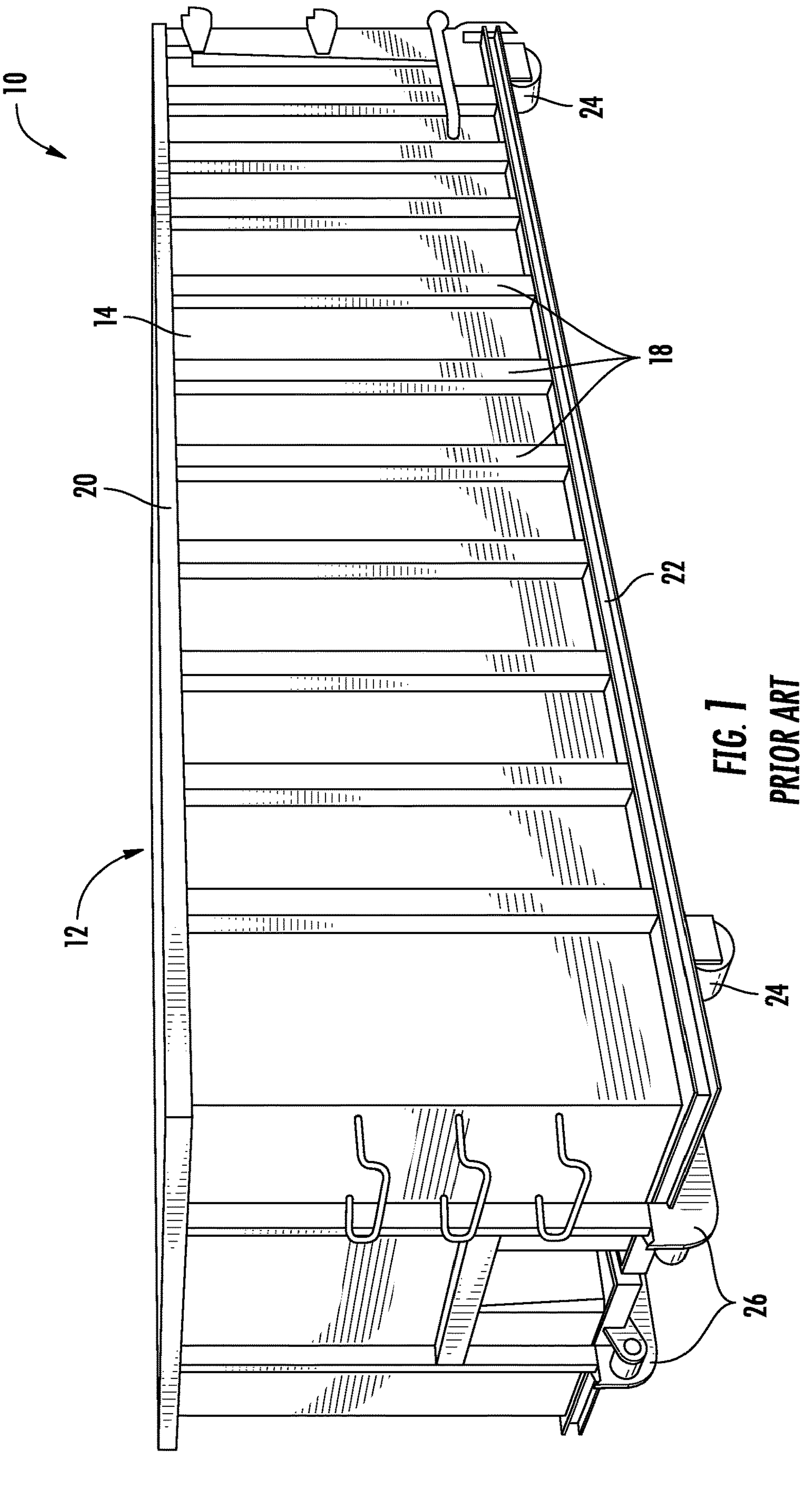
FIG. 1 PRIOR ART
Figure 2:
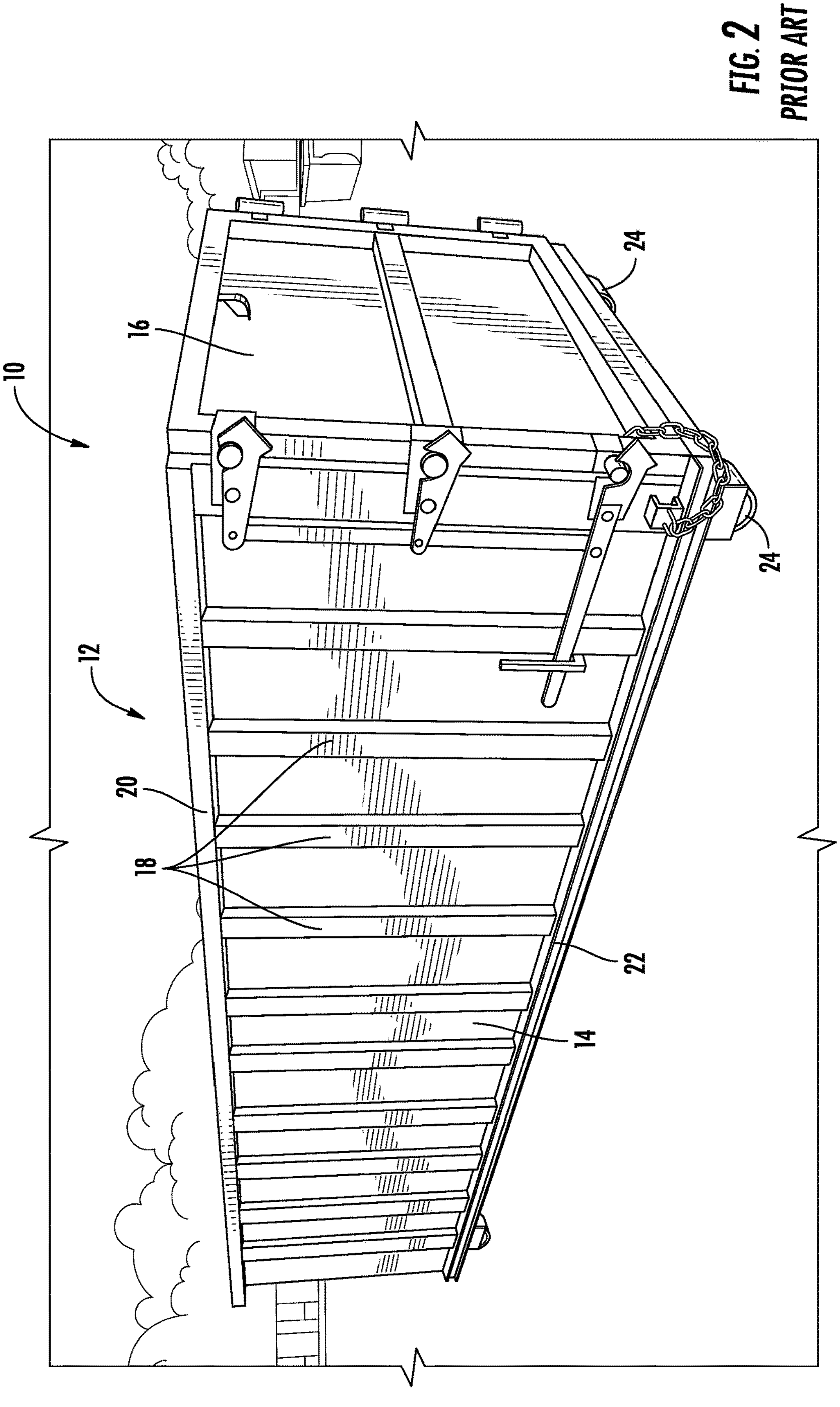
FIG. 2 PRIOR ART
Figure 3:
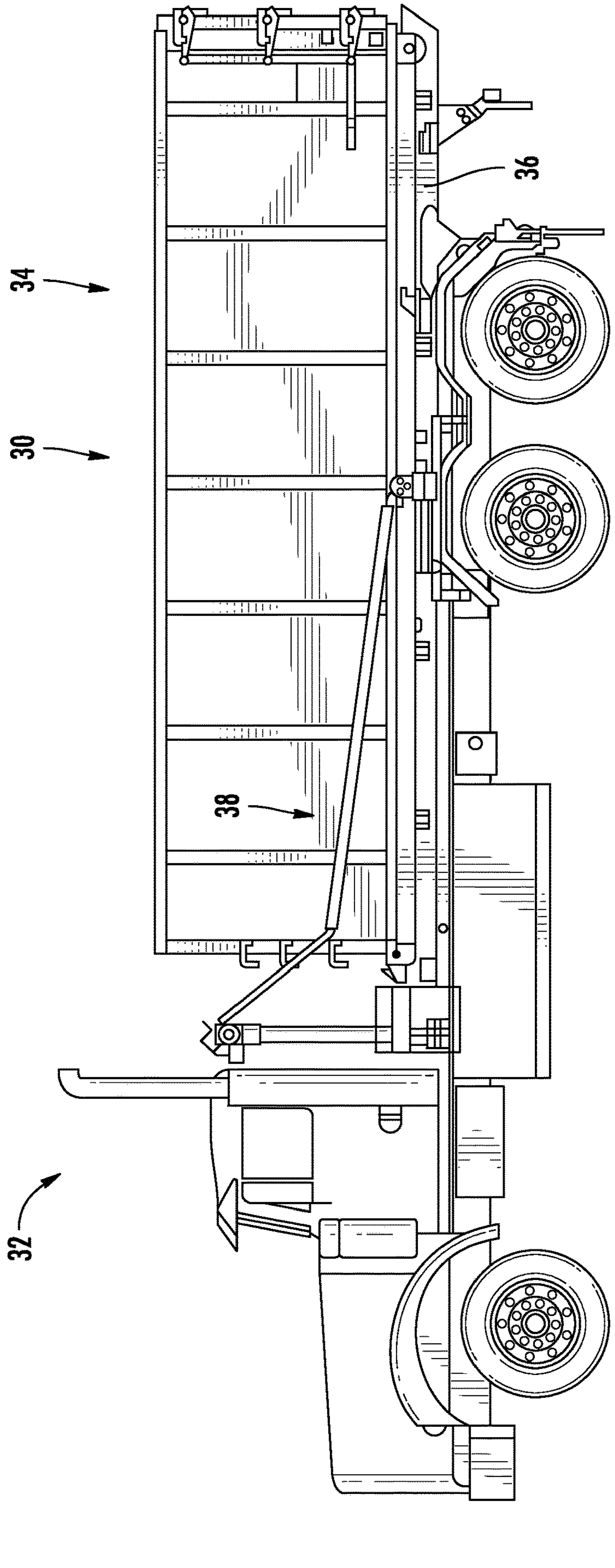
Figures 4A, 4B, 4C, 4D:
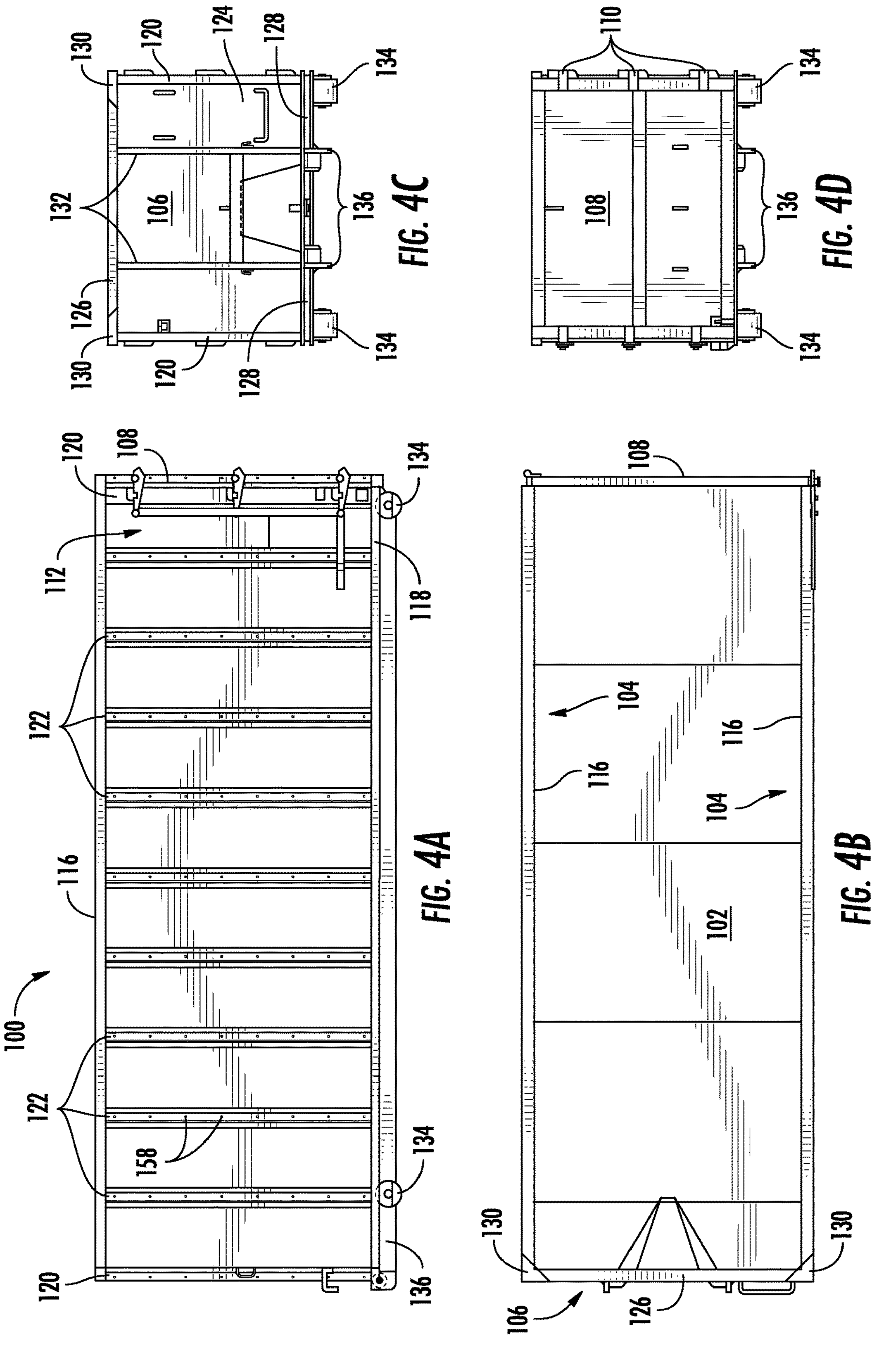
Figure 5:
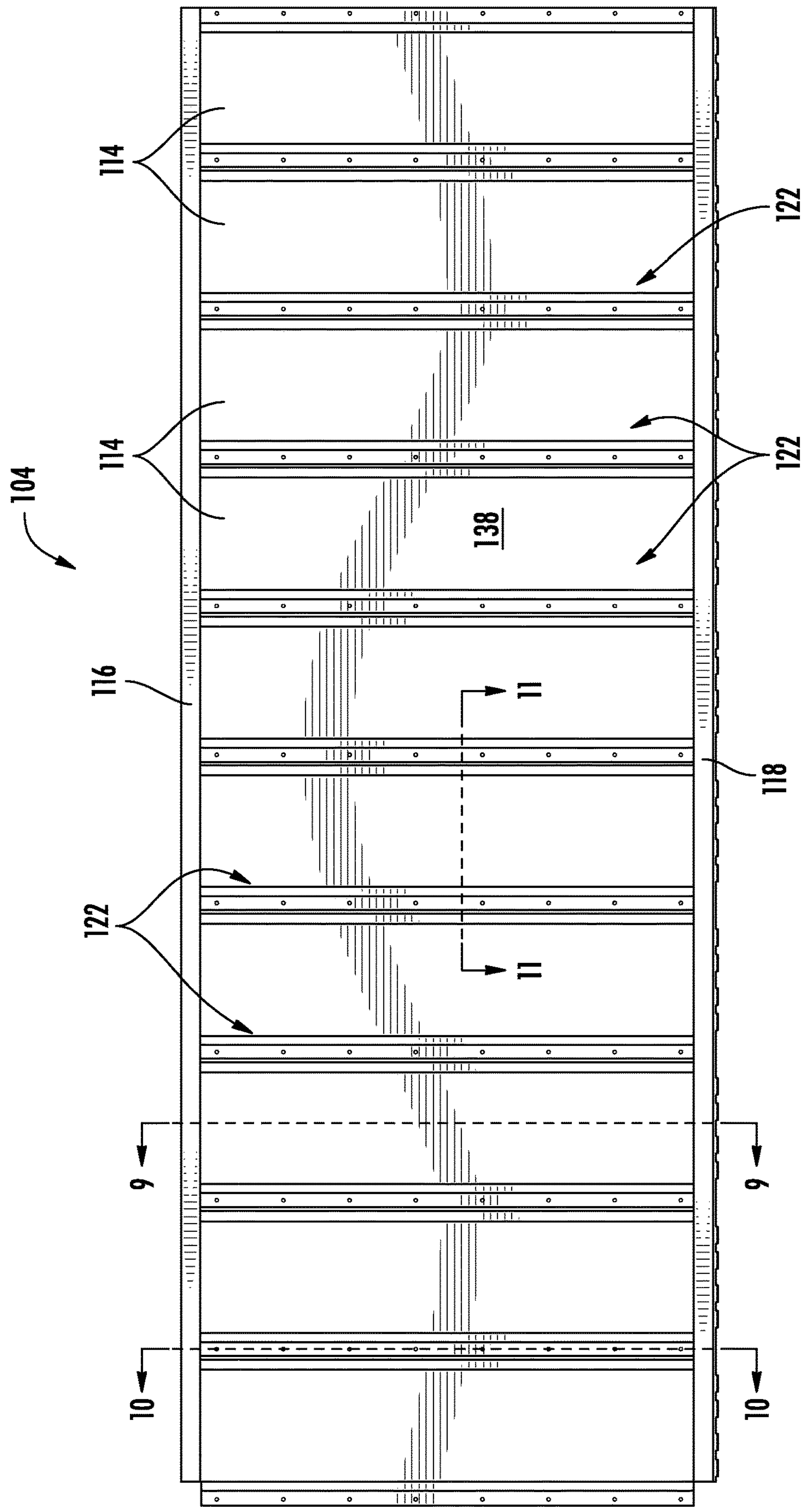
Figure 6:
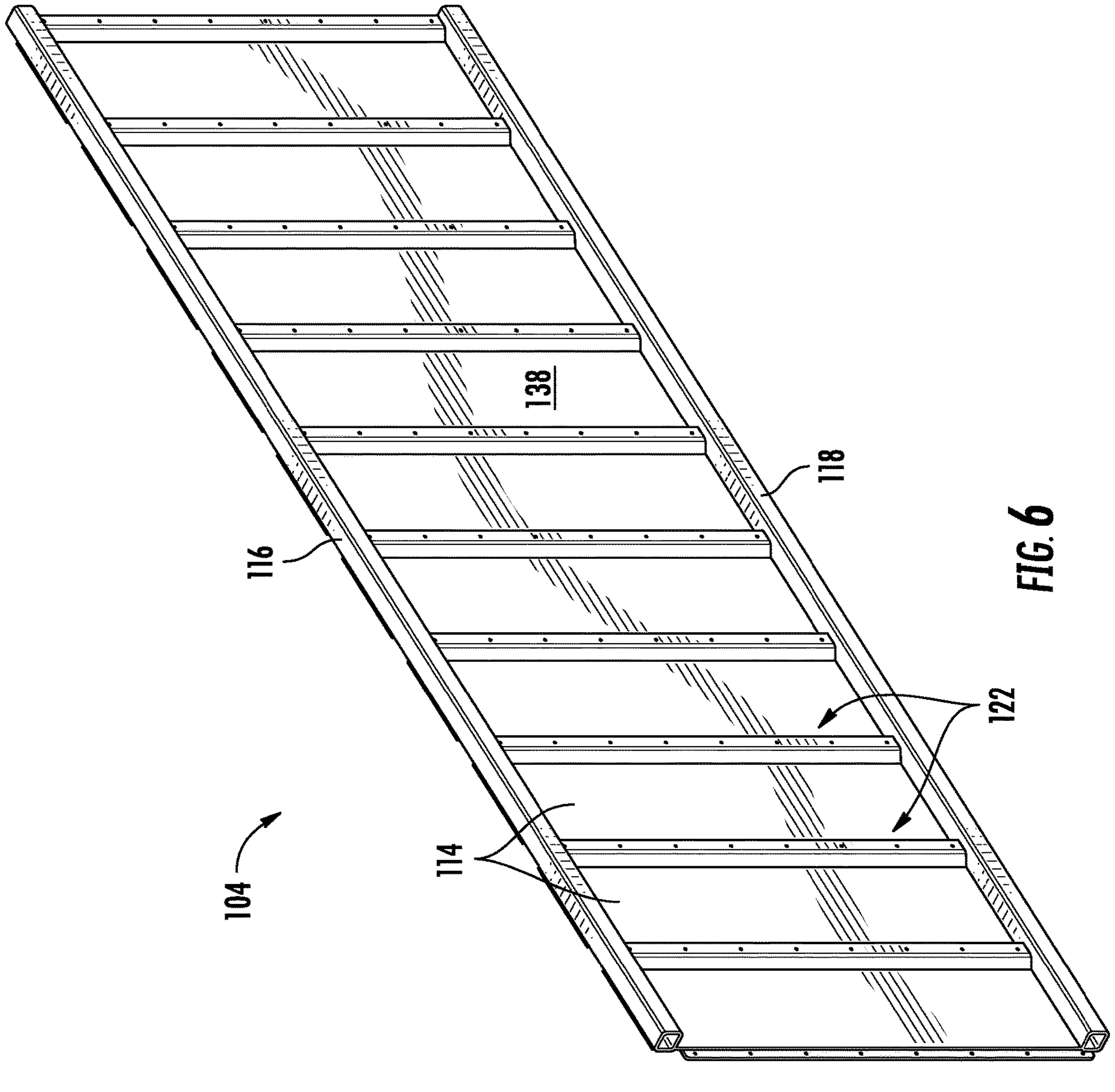
Figure 7:
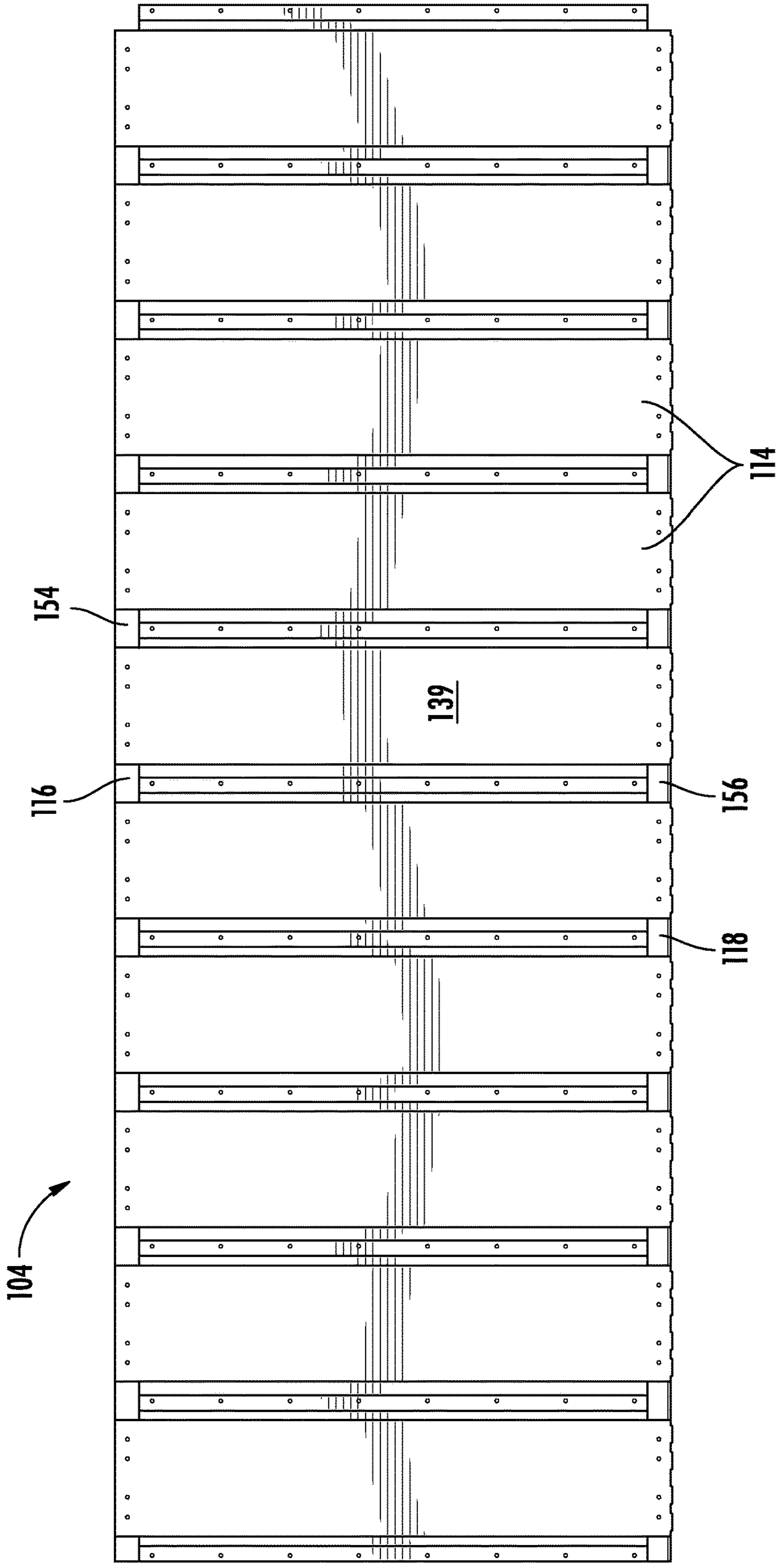
Figure 8:
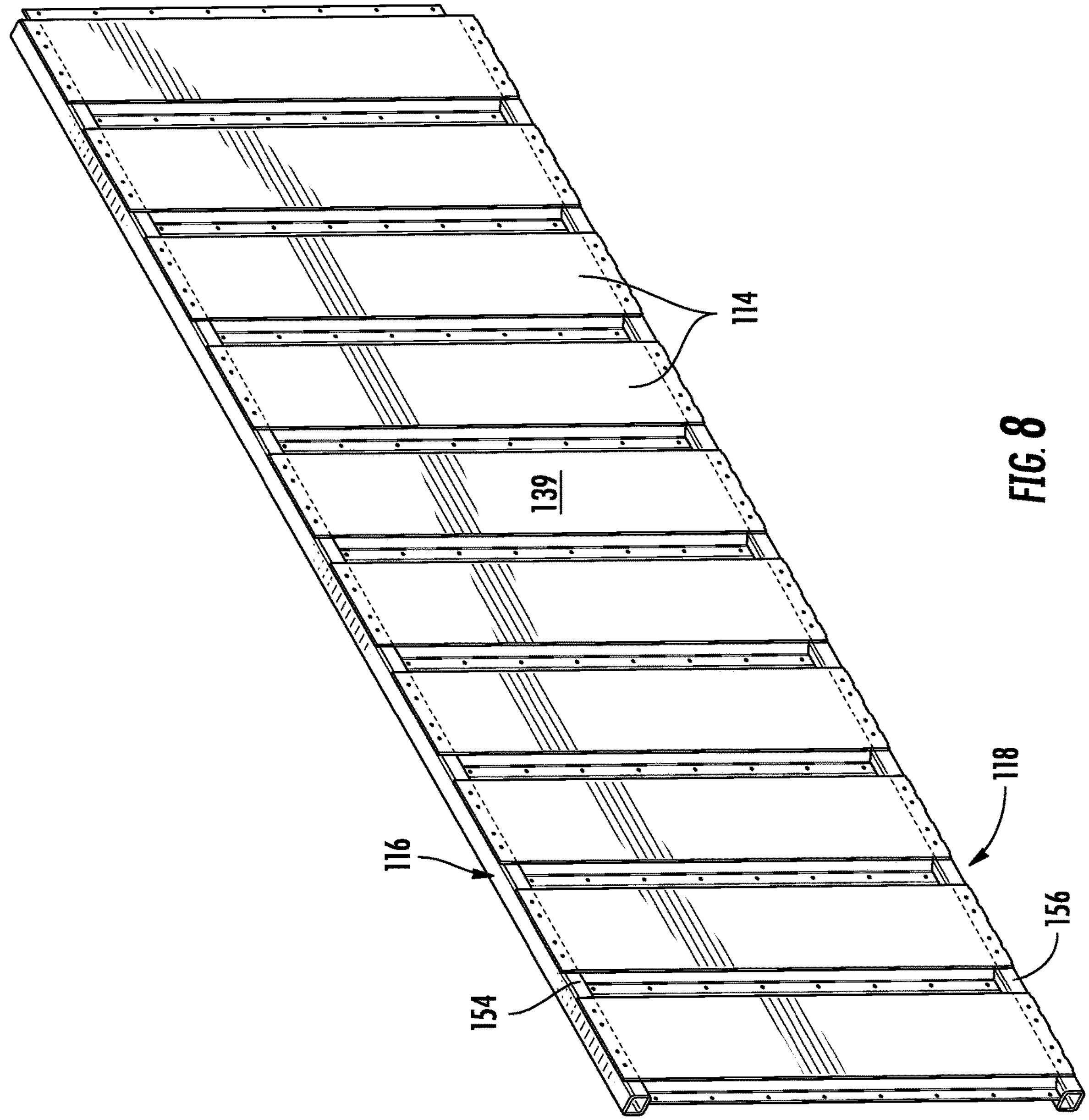
Figure 9:
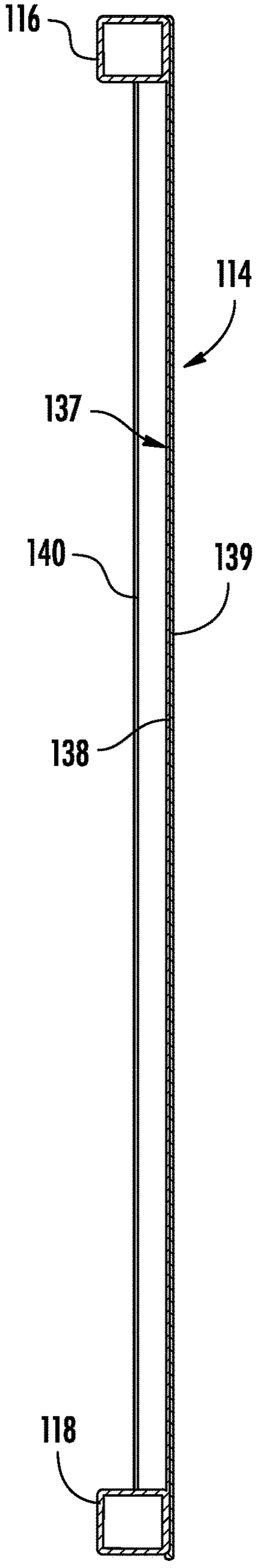
Figure 10:
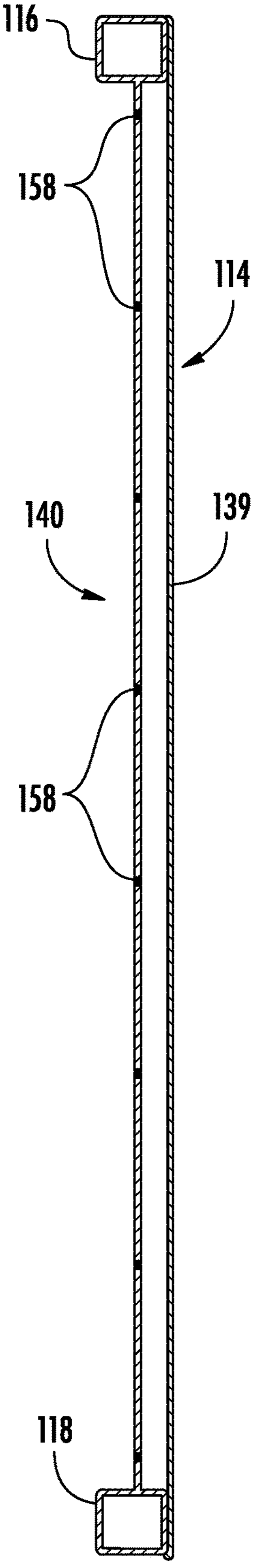
Figure 11:
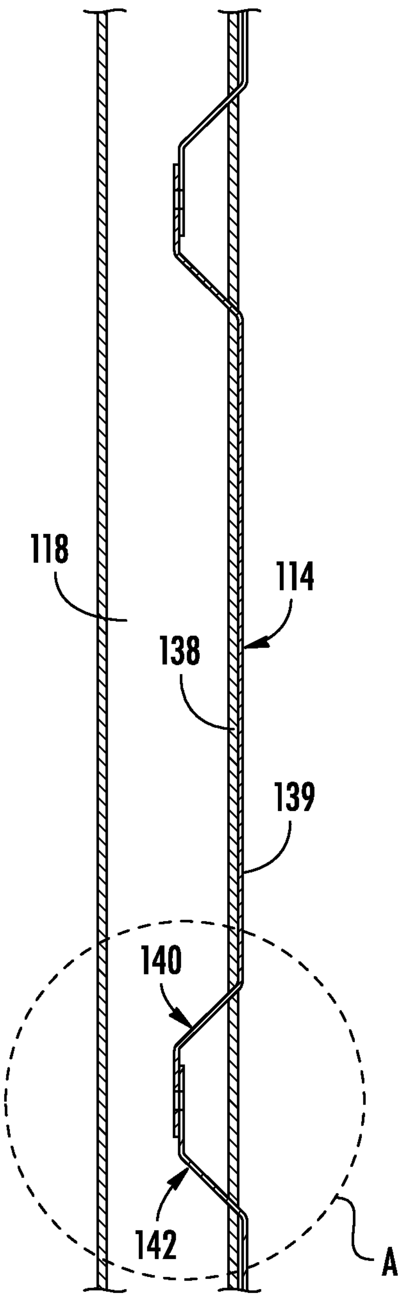
Figure 12:
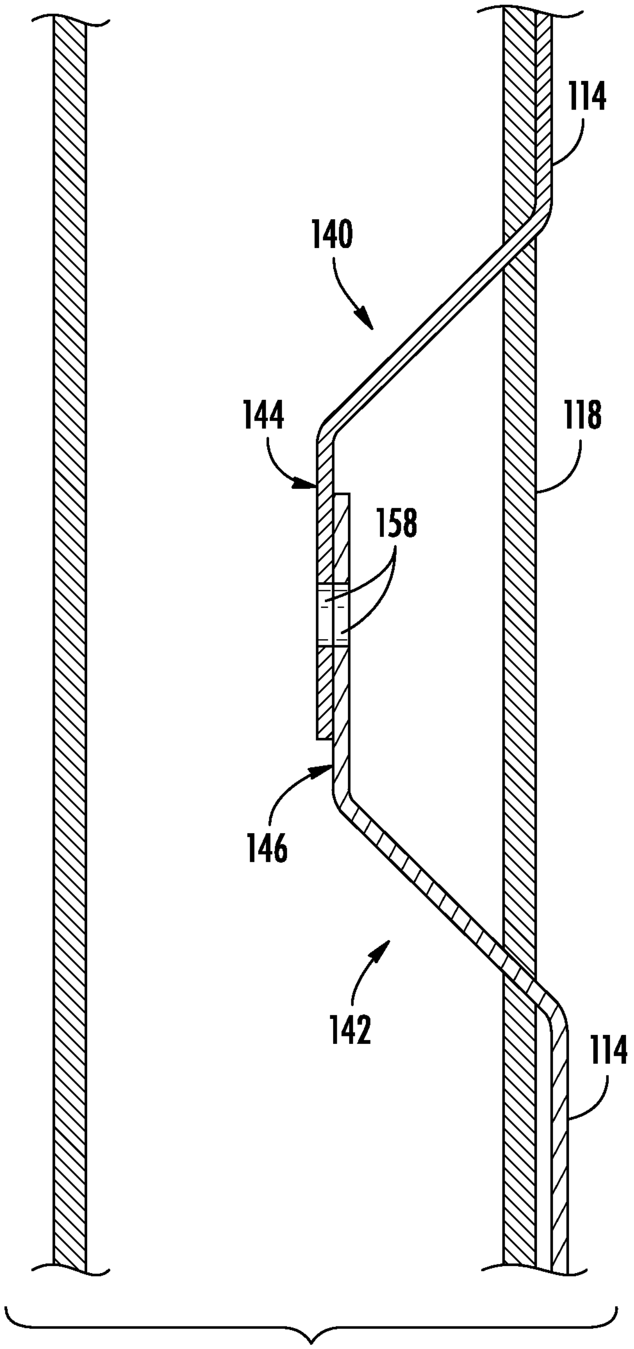
Figure 13:
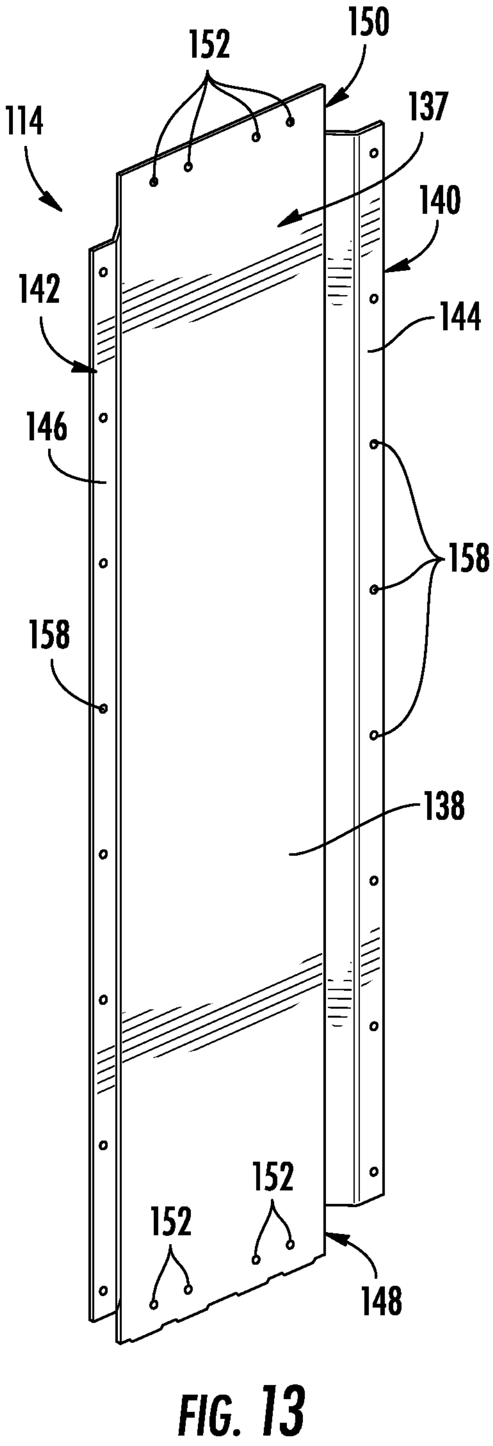
Figure 14:
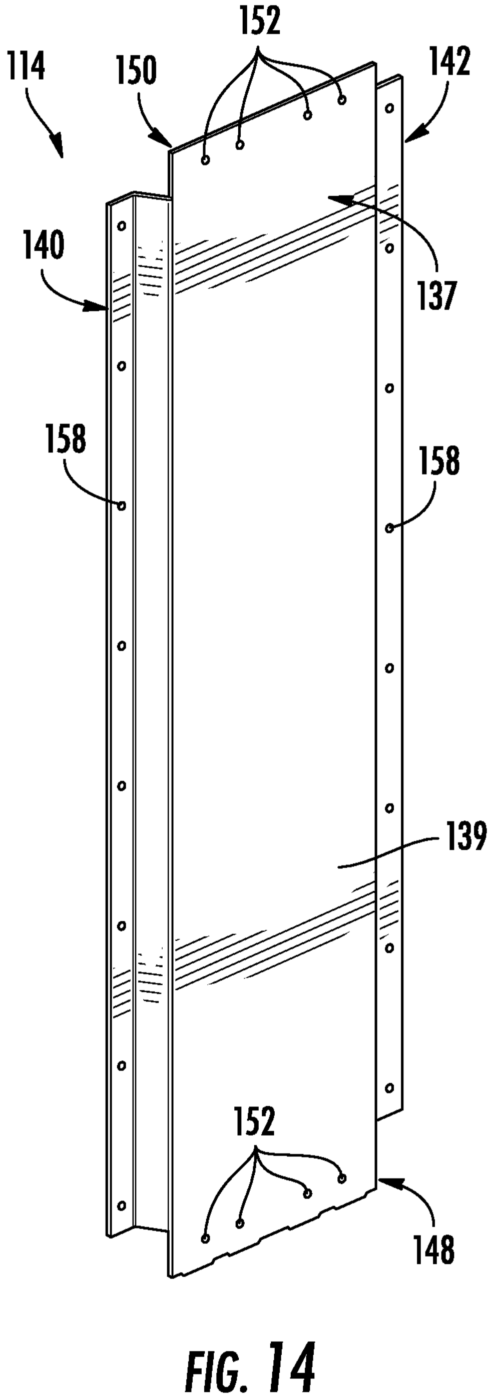
Figure 17:
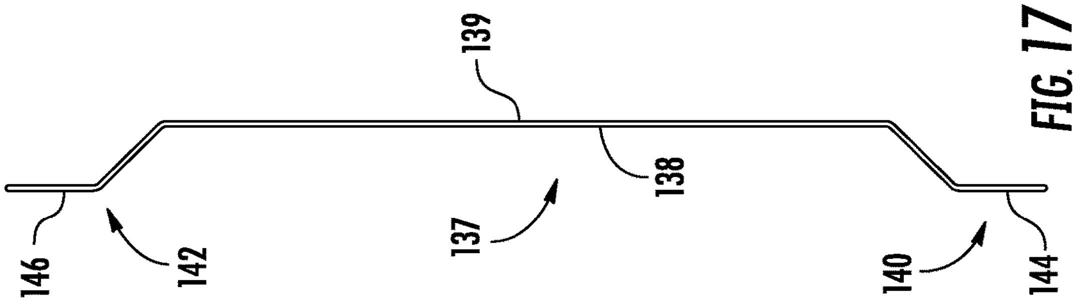
Figure 16:
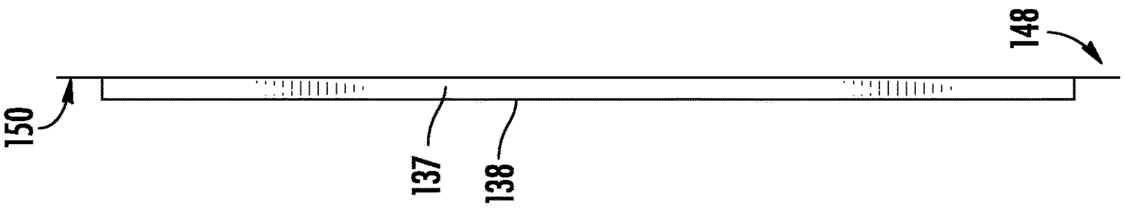
Figure 15:
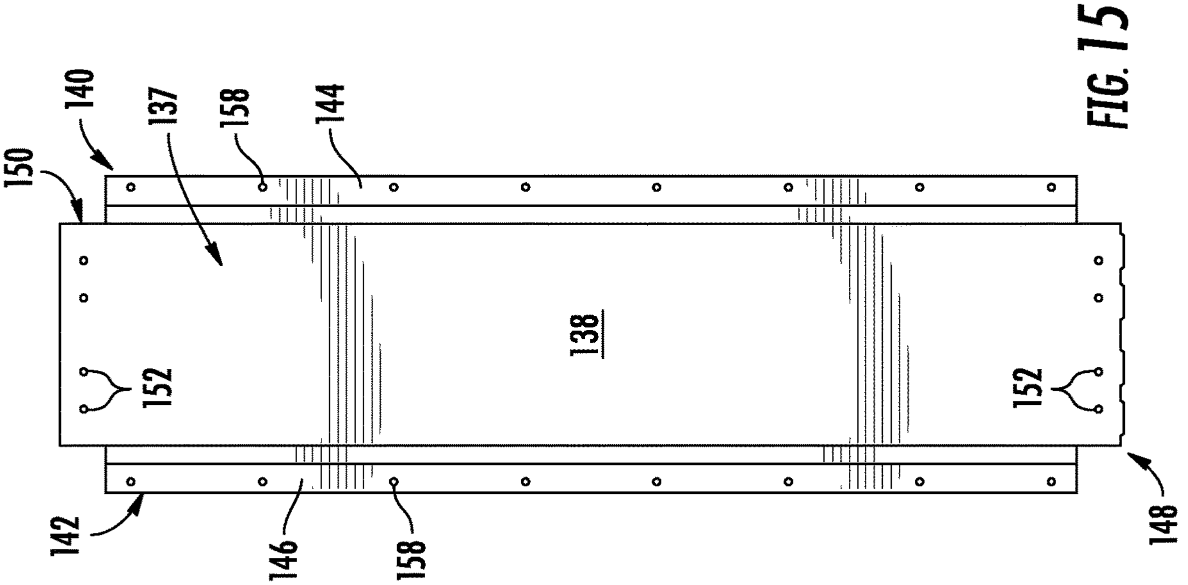
Figure 18:
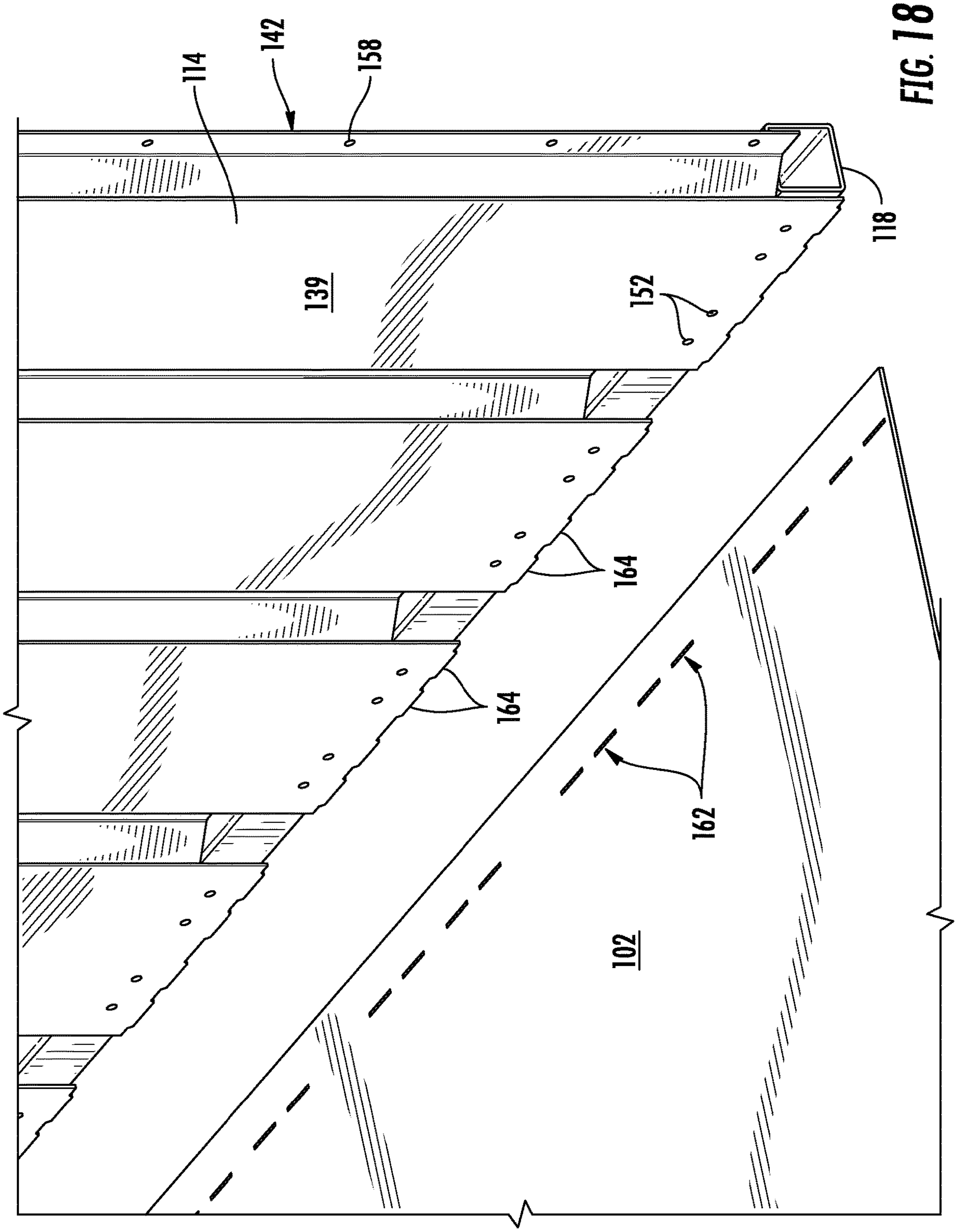
Figure 19:
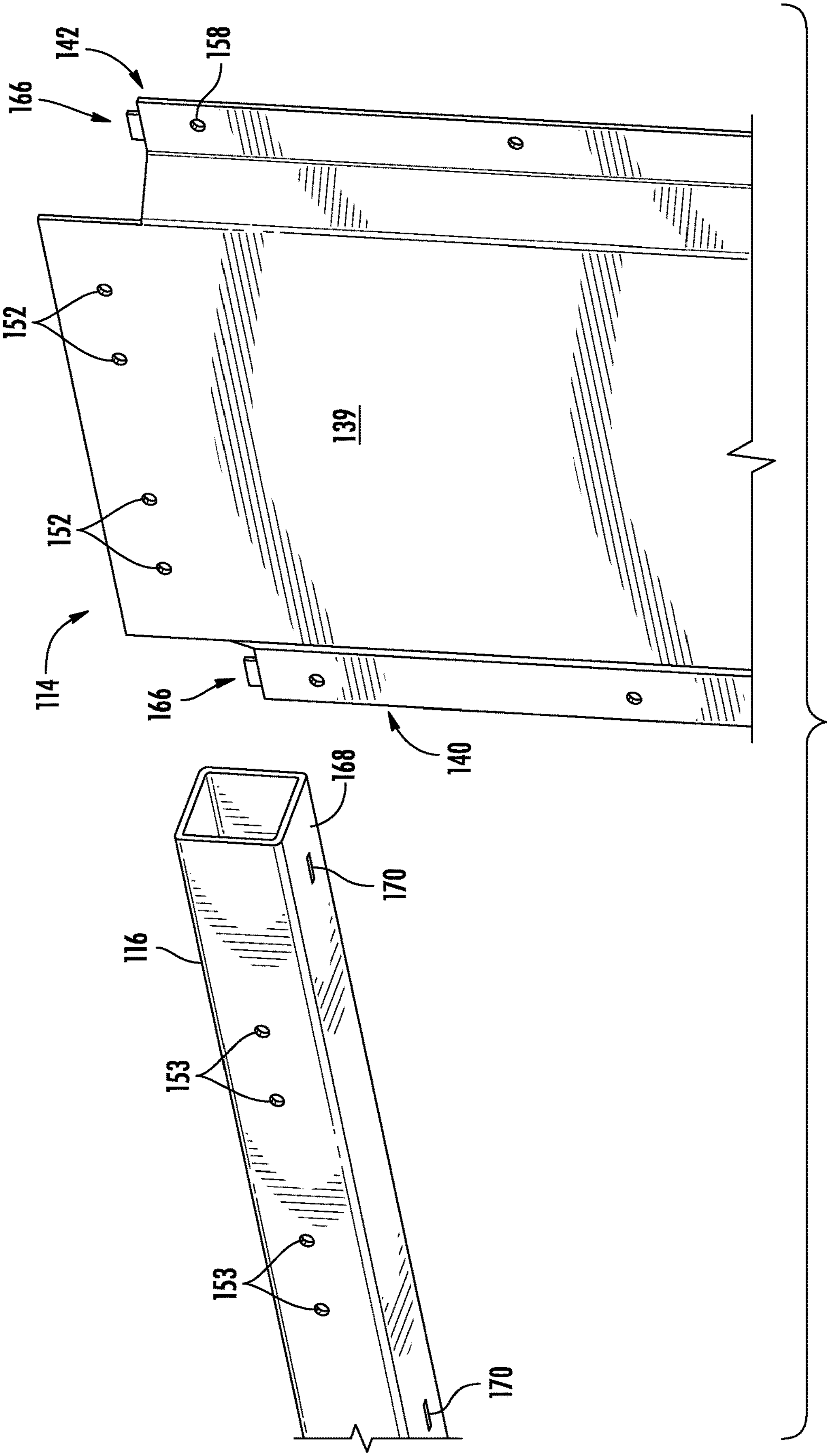
Figure 20:
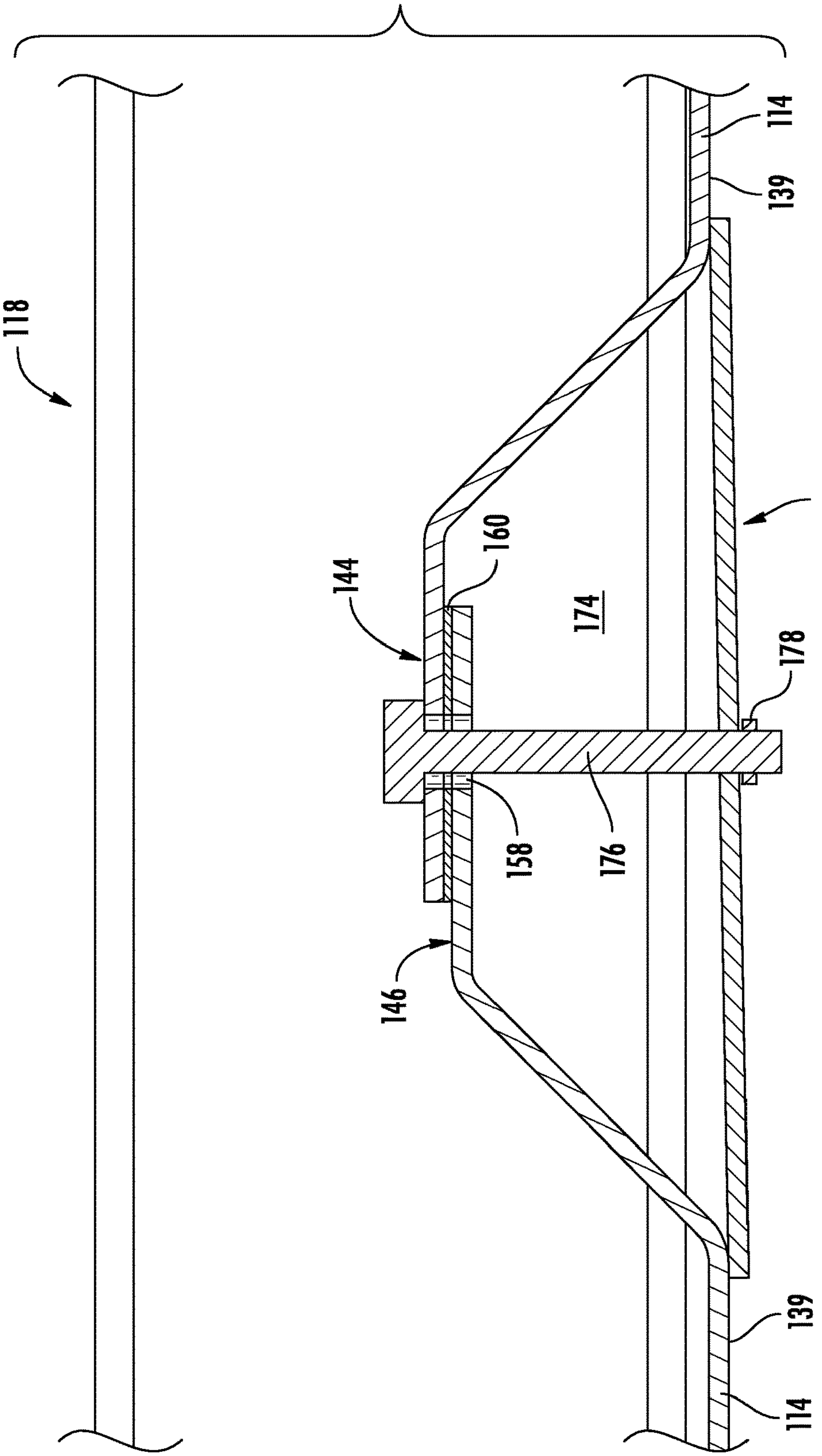
Figure 21:
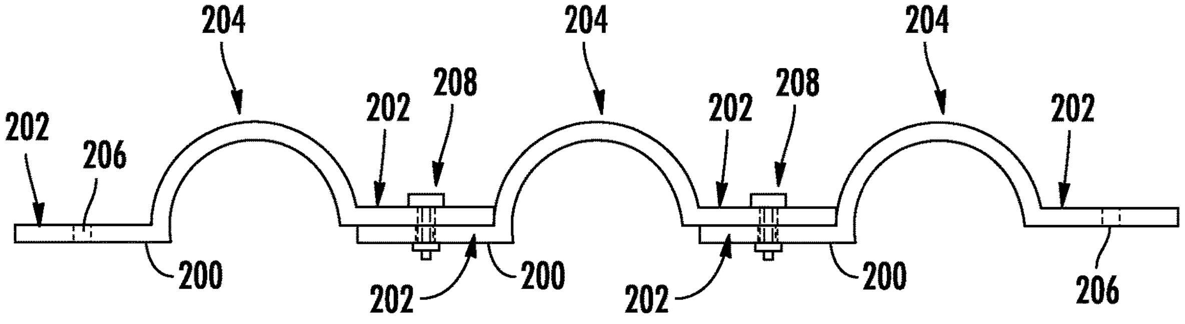
Figure 22:
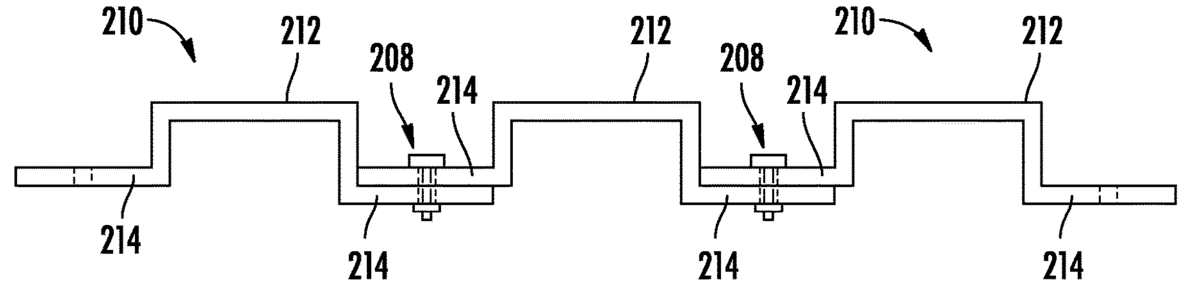
Figure 23:
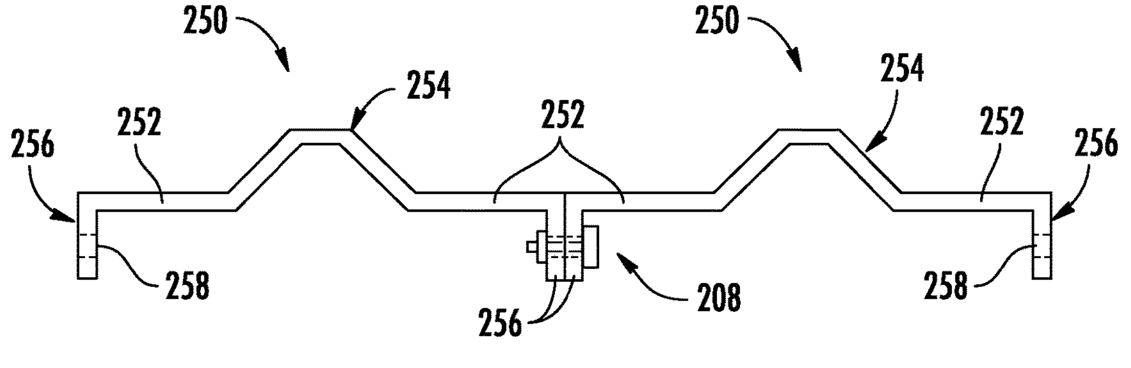

Having thus described some example embodiments in general terms, reference will now be made to the accompanying drawings, which are not necessarily drawn to scale, and wherein:

FIGS. 1-2 are perspective views of a prior art roll-off container;

FIG. 3 is a schematic elevation view of a roll-off container carried on a truck having a hoist apparatus;

FIG. 4A is a side elevation view of a container according to an embodiment of the present invention;

FIG. 4B is a plan view of the container of FIG. 4A;

FIG. 4C is a front elevation view of the container of FIG. 4A;

FIG. 4D is a rear elevation view of the container of FIG. 4A;

FIG. 5 is a front elevation view of a container side wall assembly according to an embodiment of the present invention;

FIG. 6 is a front perspective view of the container side wall assembly of FIG. 5;

FIG. 7 is a rear elevation view of the container side wall assembly of FIG. 5;

FIG. 8 is a rear perspective view of the container side wall assembly of FIG. 5;

FIG. 9 is a cross-sectional view taken along the line 9-9 in FIG. 5;

FIG. 10 is a cross-sectional view taken along the line 10-10 in FIG. 5;

FIG. 11 is a cross-sectional view taken along the line 11-11 in FIG. 5;

FIG. 12 is a detail view of detail A in FIG. 11;

FIG. 13 is a front perspective view of a side panel for a container wall assembly in accordance with an embodiment of the present invention;

FIG. 14 is a rear perspective view of the side panel of FIG. 13;

FIG. 15 is a front elevation view of the side panel of FIG. 13;

FIG. 16 is a side elevation view of the side panel of FIG. 13;

FIG. 17 is a top plan view of the side panel of FIG. 13;

FIG. 18 is a partial exploded perspective view of a container wall assembly and a bottom wall of a container in accordance with an embodiment of the present invention;

FIG. 19 is a partial exploded perspective view of a side panel and top rail of a container wall assembly in accordance with an embodiment of the present invention;

FIG. 20 is a detail cross-sectional view of a container wall assembly in accordance with another embodiment of the present invention;

FIG. 21 is a schematic plan view of three side panels for a container wall assembly in accordance with another embodiment of the present invention;

FIG. 22 is a schematic plan view of three side panels for a container wall assembly in accordance with yet another embodiment of the present invention; and FIG. 23 is a schematic plan view of two side panels for a container wall assembly in accordance with a further embodiment of the present invention.

Repeat use of reference characters in the present specification and drawings is intended to represent same or analogous features or elements of embodiments of the present invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of a container, such as but not limited to "vertical," "horizontal," "cupper," "lower," "front," or "rear," refer to directions and relative positions with respect to the container's orientation in its normal intended operation, as indicated in the Figures herein. Thus, for instance, the terms "vertical" and "upper" refer to the vertical direction and relative upper position in the perspectives of the Figures and should be understood in that context, even with respect to an apparatus that may be disposed in a different orientation. The term "substantially," as used herein, should be interpreted as "nearly" or "close to", such as to account for design and manufacturing tolerances of the apparatus.

Embodiments of the present invention relate to improved systems and methods for providing modular refuse container side wall assemblies. As noted above, in various embodiments, a container side wall assembly may comprise a plurality of overlapping sheets (e.g., of metal) that are releasably fastened together. In some embodiments, the side wall assembly may have a corrugated shape. In some embodiments, the side panels also may be interlocking without the use of fasteners.

Although some preferred embodiments are discussed below in the context of rectangular, open-topped roll-off containers, those of skill in the art will appreciate that the present invention is not so limited. In particular, it is contemplated that embodiments of the present invention may be used with any suitable waste, refuse, or payload container, such as but not limited to tub-style roll-off containers, intermodal containers, and dump bodies. Further, it is contemplated that various embodiments may be used with any one or all of the four container side walls, and/or the top or bottom wall of a container. In certain embodiments, the modular side wall assemblies may comprise only part of a side wall, rather than the entire side wall. Also, although certain embodiments are depicted with a vertically oriented side panel, in other embodiments the side panels may be disposed at an angle to vertical and/or arranged horizontally.

Turning now to the figures, certain details of a container constructed in accordance with an embodiment of the present invention are described below with reference to FIGS. 4A-4D and 5-18. In general, a container 100 may be a rectangular open-topped roll-off container comprising a bottom wall 102, two side wall assemblies 104 in facing opposition, a front wall 106, and a door 108. Bottom wall 102, side wall assemblies 104, front wall 106, and door 108 are coupled together to define an interior volume therein. In various embodiments, the interior volume may be at least ten (10) cubic yards, though other interior volumes may be defined in other embodiments. Door 108 is coupled with one of side wall assemblies 104 in this embodiment via hinges 110, which permit door 108 to open and close the interior volume of container 100. A latching device 112 may be coupled to one of side wall assemblies 104 to latch door 108 in a closed position as is understood. As those of skill in the art will appreciate, a door 108 may not be provided in all embodiments, and instead a fixed rear wall could be coupled between side wall assemblies 104.

In the past, the side walls of a container like container 100 typically would be formed from a rectangular metal sheet, for example formed of 12 gauge or 7 gauge steel. In the illustrated embodiment, however, each side wall assembly 104 comprises a plurality of side panels 114. The number of side panels 114 provided depends on the size of each side panel, the size or volume and shape of container 100, and the particular side of container 100 at issue. Where, as shown, a side wall assembly is provided on the long sides of an open-topped roll-off container, in one embodiment ten (10) such panels may be provided. In other embodiments and for other sides of a container, different numbers of panels 114 may be used. In that regard, the embodiment of container 100 shown in the figures comprises side wall assemblies 104 along its two long sides, with front wall 106 and door 108 being analogous to those used in conventional roll-off containers. It will be appreciated, however, that front wall 106 (or a fixed rear wall) may also or alternatively comprise side wall assemblies as described herein in other embodiments.

Side wall assemblies 104 also comprise top rails 116 that are releasably fastened (as described in more detail below) with and extend horizontally along an upper edge of side panels 114. In various embodiments, top rails 116 may comprise a length of rectangular metal tubing. The lower edge of side panels 114 may be releasably fastened with bottom rails 118, which are also preferably coupled with bottom wall 102. Corner posts 120, where provided, may be coupled with the lateral edges of a panel 114 and extend between top rails 116 and bottom wall 102. As described in more detail below, in some embodiments projections on side panels 114 together define a plurality of vertical supports 122 that extend vertically between top rails 116 and bottom rails 118. As will be appreciated, such vertical supports 122 may stiffen walls 104 and increase the bending strength thereof.

In this embodiment, front wall 106 may comprise a rectangular metal sheet 124 that extends vertically between a top rail 126 and bottom rails 128 coupled with respective upper and lower edges thereof. Metal sheet 124 also extends laterally between corner posts 120. Bottom rails 128 may also be coupled with bottom wall 102. Corner wraps 130 may be provided between top rails 116 and top rail 126 for added strength. Also, one or more vertical supports 132 may extend vertically between top rail 126 and bottom rails 128 to stiffen or otherwise provide support to front wall 106.

As with container 10 described above, in various embodiments container 100 may also comprise at least two wheels 134. In the illustrated embodiment, four such wheels 134 are provided. A substructure of container 100 may comprise a pair of longitudinal rails 136 which extend generally along the length thereof and which may provide support for bottom wall 102 and facilitate loading, unloading, and transport of container 100 on a hoist frame.

An example container side wall assembly 104 is described in more detail with reference to FIGS. 5-18. In the illustrated embodiment, side wall assembly may be about 8' tall and 22' long, though as noted above the dimensions of side wall assembly 104 will vary depending on the type of container and side wall at issue. Also as noted above, side wall assembly 104 comprises a plurality of side panels 114 that are coupled with top rail 116 and bottom rail 118 via a non-welded connection, such as mechanical fasteners. In various embodiments, suitable fasteners include, but are not limited to, bolts, screws, nails, and other mechanical fasteners. Among many possibilities, suitable bolts may include hex bolts, huck bolts, carriage bolts, and shoulder bolts. In one embodiment, the fasteners may comprise 7/16" bolts and corresponding weld nuts. Nonetheless, those of skill in the art will appreciate that fasteners other than bolts may be suitable in various embodiments. Also, those of skill in the art will appreciate that the type, number, and grade of fasteners used may vary in various applications and for various intended strengths of the container. For higher strengths, the diameter of fasteners may be increased and the number of fasteners used may increase.

In one embodiment, side panels 114 comprise a sheet of suitable strength for refuse disposal environments (e.g., 7 or 12 gauge steel), though other suitable materials may be used. Thus, side panels 114 may be planar in shape. In some embodiments, each side panel 114 may be formed from a single unitary sheet, though this is not required in all embodiments. Side panels 114 also may not comprise a sheet in some embodiments, and may instead define a tubular or double-walled structure. Also, although side panels 114 are illustrated as being generally rectangular, side panels 114 may define any suitable shape in other embodiments.

In any event, as shown, side panels 114 may be generally planar and have a body portion 137 comprising a first surface 138, which may face the exterior of a container upon assembly, and an opposite second surface 139, which may face the interior of a container upon assembly. Side panels 114 in this embodiment also may comprise a first projection 140 and a second projection 142. In other words, in some embodiments, side panels 114 comprise an inner wall portion (e.g., body portion 137) and an outer wall portion (e.g., one or more projections 140, 142) spaced apart from the inner wall portion.

First and second projections 140 and 142 respectively define flanges 144, 146 in this embodiment. Flanges 144 and 146 are spaced apart from body portion 137. In one embodiment, side panels 114 may be stamped and flanges 144, 146 may be defined during the stamping process. In other embodiments, flanges 144, 146 or other projections (as described elsewhere herein) may defined by folding or bending panels 114 during manufacturing. Further, in some embodiments, projections 140, 142 may not be unitary with body portions 137. Also, in some embodiments, a side panel 114 may comprise only a single projection 140 or 142 or may comprise more than two projections 140 or 142.

As noted above, side panels 114 may be releasably fastened to top rail 116 and bottom rail 118. In this regard, and for example, body portion 137 of each side panel 114 may define a lower end 148 and an upper end 150. Each end 148, 150 defines a plurality of apertures 152 configured to receive suitable fasteners therethrough. In one embodiment, apertures 152 may be about 0.5" in diameter, though again the size may vary. In this embodiment, there are four (4) apertures 152 on each end 148, 150. As shown, e.g., in FIGS. 7-8 and 19, each of top rail 116 and bottom rail 118 also define a plurality of apertures 153. The apertures are positioned so that, when the first surface 138 of body portion 137 is disposed against a respective rear surface 154, 156 of top rail 116 and bottom rail 118, they align with apertures 152. Thereby, each side panel 114 may be releasably fastened to top rail 116 and bottom rail 118 via the fasteners.

Thus, the height dimension of body portion 137 may be selected to correspond to the vertical distance between top rail 116 and bottom rail 118. As shown in FIG. 7, for example, the top edge of side panels 114 may be aligned with the top surface of top rail 116, and the bottom edge of side panels 114 may be aligned with the bottom surface of bottom rail 118. In other embodiments, however, side panels 114 may be releasably fastened to top rail 116 and bottom rail 118 in another manner, and as such the height dimension of body portion 137 may vary in other embodiments. For instance, either or both of lower end 148 and upper end 150 may be partially or entirely bent so that it can be attached to an upper or lower surface of bottom rail 118 and/or top rail 116, rather than to the rear surfaces 156, 154 thereof.

In certain embodiments, each side panel 114 may partially overlap with another side panel 114 when side wall assembly 104 is assembled. The overlapping feature in this embodiment helps maintain both the structural integrity and the watertight properties of conventional containers while eliminating welded seams. For example, either or both projection 140, 142 of each side panel 114 may overlap with another projection 140, 142 of an adjacent side panel 114. More particularly, the locations of the apertures defined in top rail 116 and bottom rail 118 may be selected so that, when side panels 114 are fastened to top rail 116 and bottom rail 118, their relative positions cause a projection 140, 142 or one side panel to overlap with a projection 140, 142 of an adjacent side panel. In other embodiments described in more detail below, side panels 114 may overlap at locations on their respective body portions, rather than at their respective projections. Also, side panels 114 may not overlap at all in still other embodiments.

Additionally, each side panel 114 is releasably fastened to its adjacent side panel(s) 114. In the illustrated embodiment, the flange(s) 144, 146 of each side panel 114 preferably define a plurality of apertures 158. In one embodiment, apertures 158 may be centered on flanges 144, 146 and spaced every 12", though the number of apertures 158 used may vary in other embodiments. As shown, each side panel flange 144, 146 may define eight (8) apertures 158. Apertures 158 preferably are located in each flange 144, 146 so that, when two adjacent side panels 114 are assembled to top rail 116 and bottom rail 118, the apertures 158 in the respective flange 144 or 146 of each side panel 114 will be in alignment (see, e.g., FIGS. 11-12). Accordingly, fasteners (e.g., bolts) may be inserted through the aligned apertures 158 and used to secure side panels 114 together.

As best seen in FIG. 11, in a given container wall assembly 104, side panels 114 may be assembled so that their respective projections 140, 142 alternate between being in front of (or exterior of) the projections 140, 142 of adjacent side panels and being behind (or interior of) the projections 140, 142 of adjacent side panels. For instance, the side panel 114 that is completely shown in FIG. 11 has its projections 140, 142 disposed in front of (or exterior of) the projections 142, 140 of each of its adjacent side panels 114 (which are only partially shown in FIG. 11). However, this particular configuration is not required in all embodiments. Each panel 114 could have its projection 142 disposed behind (or interior of) a projection 140 of one adjacent panel and its projection 140 in front of (or exterior of) a projection 142 of the other adjacent panel, or vice versa. Depending on the material from which each side panel 114 is made, side panel 114 may be flexible enough to allow assembly in any of these configurations. In other embodiments, such as those discussed with regard to FIGS. 21-22 below, side panels 114 may be dimensioned to be assembled in one particular configuration or orientation.

In the illustrated embodiment, flanges 144 and 146 are co-planar and offset from the plane in which body portion 137 lies. Likewise, where the assembly configuration illustrated in FIG. 11 is used, the body portions 137 of adjacent panels will be slightly offset and will not be co-planar. However, this is not required in all embodiments. For instance, flanges 144 and 146 may extend in parallel, but offset planes. Likewise, in some configurations, body portions 137 of adjacent side panels 114 may extend in the same plane, or each body portion 137 may extend in a different plane.

When projections 140, 142 of adjacent side panels 114 are fastened together in this embodiment, they together define the plurality of vertical supports 122 mentioned above. These vertical supports 122 may be analogous in function to the vertical supports 18 of conventional open-topped roll-off containers in some embodiments. When viewed in plan or cross-section, vertical supports 122 may have a polygonal shape in this embodiment, but vertical supports may have any suitable shape in other embodiments.

Vertical supports 122 preferably extend from the top rail 116 to the bottom rail 118. More specifically, in one embodiment, the vertical dimension of projections 140, 142 is preferably selected to correspond to the vertical distance between the top surface of bottom rail 118 and the bottom surface of top rail 116, so that, following assembly, the bottom edges of flanges 144, 146 engage the top surface of bottom rail 118 and the top edges of flanges 144, 146 engage the bottom surface of top rail 116. Thus, projections 140, 142 may be shorter in height than body portion 137 in some embodiments.

Depending on the application for which container 100 will be used, in various embodiments, a suitable gasket material (e.g., rubber gasket 160 in FIG. 20) may be disposed between projections 140, 140 of adjacent side panels 114 to help maintain watertightness. Likewise, in various embodiments, a suitable gasket material also may be disposed between the portions of side panels 114 that are in engagement with top rail. For instance, gaskets could be disposed between body portion 137 and the rear surfaces 154, 156 of top rail 116 and/or bottom rail 118. Gaskets also could be disposed between the bottom surface of top rail 116 and the top edges of flanges 144, 146 and/or between the top surface of bottom rail 118 and the bottom edges of flanges 144, 146. However, gasketing is not required in all embodiments.

With reference now in particular to FIG. 18, as noted above, bottom rail 118 is coupled with a bottom wall 102 of container 100. In some embodiments, one or more side panels 114 also are coupled with bottom wall 102. For example, bottom wall 102 optionally may define a plurality of locating features (e.g., slots 162) and each applicable side panel 114 optionally may define a plurality of correspondingly-sized locating features (e.g., tabs 164). Tabs 164 may extend from lower end 148 of each applicable side panel 114, and may be any suitable shape. As shown, tabs 164 are rectangular in shape. Slots 162 are located in bottom wall 102 and configured to receive tabs 164 and help position side panels 114 during assembly of side wall assembly 104. This or another suitable coupling between side panels 114 and bottom wall 102 also may add rigidity to container 100.

FIG. 19 is an exploded view of a side wall 114 and top rail 116 in accordance with another embodiment. Here, top rail 116 and projections 140, 142 may define similar locating features. For instance, projections 140, 142 may each comprise one or more tabs 166 extending vertically from upper edges thereof. A bottom surface 168 of top rail 116 may define correspondingly sized slots 170 that are located and configured to receive tabs 166 during assembly of side wall assembly 104. In various embodiments, tabs also could be disposed on the lower edges of projections 140, 142 and configured to mate with corresponding slots defined in a top surface of bottom rail 118. Any such tabs may be provided in addition to or in the alternative to the tabs described with reference to FIG. 18 in various embodiments.

FIG. 20 is a detail cross-sectional view of a container wall assembly in accordance with another embodiment of the present invention. This figure is analogous to the view of FIG. 12, but in this embodiment, the container wall assembly comprises one or more interior wall plates 172. As shown, wall plates 172 optionally may be provided between adjacent side panels 114 at locations opposite the overlapping flanges 144, 146. Thus, wall plates 172 may be located on the interior wall (e.g., second surface 139) side of wall assembly 104. Wall plates 172 may be provided, for example, to create a more uniform interior wall in container 100 and to increase the watertightness of container 100. Wall plates 172, where provided, may also increase the strength and rigidity of container 100 and vertical supports 122. Wall plate 172 may be rectangular in shape and sized to fill and/or cover a recess 174 in the interior wall created by projections 140, 142. In the illustrated embodiment, wall plate 172 is wider than recess 174 so that its lateral edges abut second surface 139 of side panels 114. In other embodiments, wall plate 172 could be dimensioned to be received with recess 174 in other embodiments such that the interior-facing side of wall assembly 104 defines a continuous, smooth surface. Wall plate 172 may be coupled with side panels 114 via a bolt 176 that is received through apertures 158 defined in flanges 144, 146 and a nut 178 that is received on bolt 172 and tightened against wall plate 172.

It is contemplated that, in various embodiments, side panels of a container wall assembly may have cross-sectional shapes that differ from the cross-sectional shape of side panels 114 described above. Each side panel may be the same as its adjacent side panel(s) in some embodiments, but that is not required. Alternating side panels, or portions thereof, could have different dimensions or shapes, including differing thicknesses and/or widths.

In that regard, and turning now to FIG. 21, a portion of a side wall assembly comprising three side panels 200 is schematically illustrated in plan view. In this embodiment, each side panel 200 defines a body portion 202 and a projection 204. Unlike side panels 114 described above, here side panels 200 are releasably fastened together at their respective body portions 202, rather than at their respective projections 204. Body portions 202 define apertures 206 in which bolts 208 are received to releasably fasten side panels 200 to one another. Thus, in this embodiment, each side panel comprises its own vertically extending support, unlike the vertical supports 122 that were formed by the assembly of the projections of adjacent side panels.

Also unlike side panels 114, in this embodiment, projections 204 are semicircular when viewed in plan or cross-section. Further, in this embodiment, each side panel 200 is not symmetrical when viewed in plan. Rather, the left-hand side of the body portion 202 is disposed in a plane that is parallel with but offset from (e.g., behind or interior of) the plane in which the right-hand side of body portion 202 lies.

In the embodiment of FIG. 22, side panels 210 define projections 212 that are rectangular in shape when viewed in plan or cross-section. Also, in this embodiment, the width of each projection 210 is greater than the width of body portions 214. In this embodiment, unlike the embodiment of FIG. 21, the plane in which the left-hand side of body portion 214 lies is in front of (or exterior of) the plane in which the right-hand side of body portion 214 lies.

FIG. 23 illustrates an embodiment including two side panels 250. In this embodiment, side panels 250 are releasably fastened together but do not overlap one another. In particular, side panels 250 comprise a body portion 252 and a projection 254 therefrom. Body portion 252 also defines two lateral flanges 256. Each flange 256 defines an aperture 258 configured to receive a suitable fastener, such as a bolt 208. When side panels 250 are disposed side-by-side, flanges 256 of adjacent panels are in engagement, and their respective apertures 258 are in alignment. In the illustrated embodiment, flanges 256 extend toward the interior volume of a container, opposite the direction of projections 254. In other embodiments, flanges 256 could extend in the same direction as projections 254.

Based on the foregoing, it will be appreciated that embodiments of the invention provide improved containers and modular wall assemblies therefor. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A container, comprising:

a first side wall, a second side wall opposite the first side wall, a front wall coupled with the first and second side walls, a rear wall opposite the front wall and coupled with at least one of the first and second side walls, and a bottom wall coupled with at least the first and second side walls and the front wall;

the first side wall, second side wall, front wall, rear wall, and bottom wall together defining an interior volume of at least ten (10) cubic yards;

at least one of the first side wall, second side wall, front wall, and rear wall comprising:

a top rail and a bottom rail;

a first side panel fastened with the top rail and the bottom rail, the first side panel comprising:

a first body portion;

a first projection having a first flange, the first flange spaced apart from the first body portion; and a second side panel fastened with the top rail, the bottom rail, and the first side panel, the second side panel comprising:

a second body portion;

a second projection having a second flange, the second flange spaced apart from the second body portion;

wherein at least one of the first body portion of the first side panel and the second body portion of the second side panel defines a plurality of tabs that are received in corresponding slots defined in the bottom wall.

2. The container of claim 1, wherein the first projection of the first side panel is bolted to the second projection of the second side panel.

3. The container of claim 2, wherein the second side panel defines a third projection that is laterally opposed to the second projection, the third projection having a third flange, the third flange spaced apart from the second body portion.

4. The container of claim 3, further comprising a third side panel, the third side panel comprising a fourth projection that is bolted to the third projection of the second side panel.

5. The container of claim 3, wherein the second flange and the third flanges are co-planar.

6. The container of claim 1, wherein the first body portion and the second body portion are co-planar.

7. The container of claim 1, wherein each of the side panels is formed from a unitary metal sheet.

8. A container, comprising:

vertical side walls and a horizontal bottom wall coupled with the vertical side walls;

the vertical side walls and bottom wall together defining an interior volume, the interior volume of at least ten (10) cubic yards;

at least one of the vertical side walls comprising:

a plurality of side panels fastened together, each of the plurality of side panels defining an inner wall portion and an outer wall portion spaced apart from the inner wall portion;

a top rail fastened with the inner wall portion of each of the plurality of side panels; and a bottom rail fastened with the inner wall portion of each of the plurality of side panels;

wherein the outer wall portions of the plurality of side panels extend vertically from the top rail to the bottom rail;

wherein the inner wall portion of at least one of the plurality of side panels defines a plurality of tabs that are received in corresponding slots defined in the horizontal bottom wall.

9. The container of claim 8, wherein the outer wall portion of at least one of the plurality of side panels defines a plurality of tabs that are received in corresponding slots defined in the top rail.

10. The container of claim 8, wherein adjacent panels of the plurality of side panels are bolted together at their respective outer wall portions.

11. The container of claim 8, wherein each side panel of the plurality of side panels partially overlaps with another side panel of the plurality of side panels.

* * * * *